May 10, 1938.  W. J. OESTERLEIN  2,117,034

MOTOR GENERATOR TRUCK

Filed June 13, 1935

INVENTOR.
William J. Oesterlein
BY Louis Quarles
ATTORNEY.

Patented May 10, 1938

2,117,034

UNITED STATES PATENT OFFICE 2,117,034

MOTOR GENERATOR TRUCK

William J. Oesterlein, Wauwatosa, Wis., assignor to Harnischfeger Corporation, Milwaukee, Wis., a corporation of Wisconsin Application June 13, 1935, Serial No. 26,353

4 Claims. (Cl. 280—1)

This invention relates to portable motor generator truck and frame construction and resides in a novel combination of parts wherein a horizontal generator casing carries fixed and pivotal axles attached directly to said casing without the interposition of a frame; the casing at the same time carrying an overhanging motor housing so that complete disassembly of the motor generator can be accomplished without derangement of the frameless truck.

Heretofore many forms of portable motor generator truck construction have been employed, principally for electric welding purposes. The most common form of said construction comprises a rectangular plane, usually of structural steel having wheeled axles fore and aft, one of which is pivotally connected to said frame for starting purposes. Upon this frame are separately mounted direct connected motor and generator. In such constructions the frame adds materially to the bulk and weight of the complete machine, but complete access to all of the parts is possible without derangement of the truck. In some cases a typical two-bearing motor generator is similarly mounted and in such cases disassembly of parts is possible without derangement of the truck.

Heretofore, in order to avoid the added bulk and weight of the frame of the truck attempts have been made to employ the housing proper of a motor generator set for the double purpose of housing the generator and forming the frame of the truck. In such constructions one axle of the truck has been attached to the motor half of the motor generator housing and the other axle attached to the generator half thereof. Upon separation of the motor generator housing for access to the interior thereof the main structural member of the truck frame becomes deranged and repair work is thereby complicated. In the construction of this invention, however, the truck frame is entirely dispensed with and complete access to the interior of the apparatus may be had without derangement of the truck.

The apparatus of this invention is best described by reference to the accompanying drawing, wherein—

Figure 1:
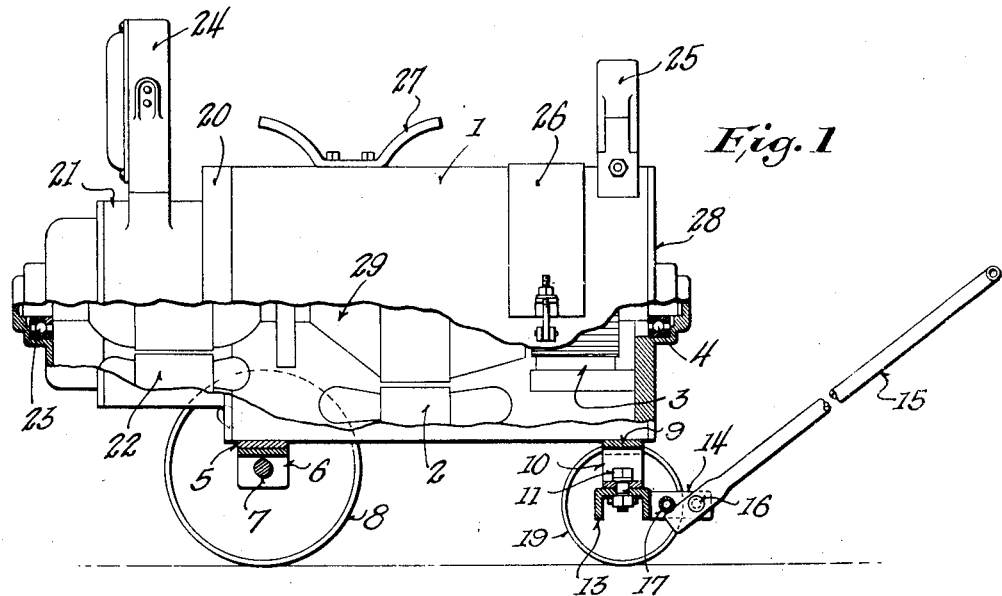
Fig. 1 shows a side elevation of the apparatus of this invention, part of the view being shown in section.
Figures 2, 3:
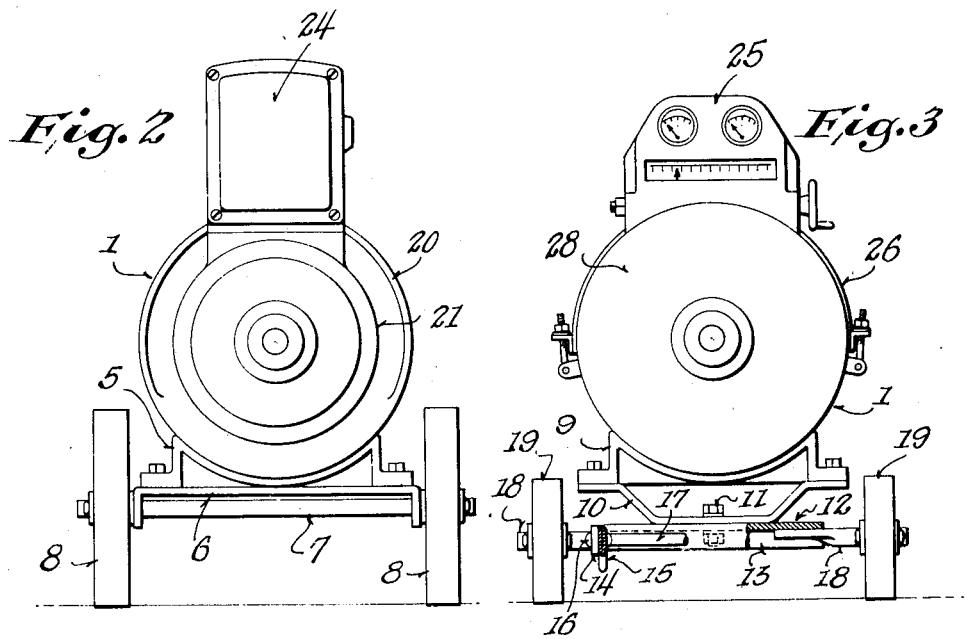
Fig. 2 is an end elevation showing the apparatus of this invention as viewed from the motor end.
Fig. 3 is an end elevation of the apparatus of this invention as viewed from the generator end, part of the axle structure being broken away.

Referring to Fig. 1, the apparatus is shown as consisting of a horizontal tubular casing 1, forming a support for a field 2, a brush mounting 3, and an end bearing 4 of the generator portion of the motor generator. Rigidly attached to the casing 1, as by electric welding, is an axle support 5, shown in section in Fig. 1 and more clearly in Fig. 2. An axle support 5 is rigidly bolted to a strap 6 in which an axle 7 is secured. The axle 7 carries truck wheels 8, as shown clearly in Fig. 2. Likewise rigidly secured to the casing 1 is a front axle support 9 to which there is securely bolted a pivot strap 10, as shown clearly in Fig. 3. A pintle 11 drops through strap 10 and forms a pivotal connection with a front axle 12. The axle 12 is shown as being constructed of a "C" channel 13 having forwardly projecting ears 14 for the support of a draw handle 15, which is held between the ears 14 by rivets 16. The draw handle 15 is maintained at an even elevation by a stop 17. Projecting from each end of the "C" channel 13 are axle ends 18 upon which are mounted truck wheels 19. Overhanging the opposite end of the casing 1 and secured thereto by a guiding flange member 20 is a cylindrical motor housing 21 carrying a motor field 22 and an end bearing 23. Between the bearing 23 and the bearing 4 the rotating parts of the machine are mounted, comprising a shaft, armatures, blowers, commutators, etc., the detail of the latter being related to the invention but forming no part thereof.

For convenience, a motor starter and controls may be mounted upon the motor housing, and in like manner controls for the generator 25 may be mounted upon the casing 1. The casing may also be provided with an opening carried by a strap 26 so that access to the brushes and other parts needing inspection may be obtained. The apparatus further being suitable for portable use, the usual attendant flexible cables may be conveniently cared for by wrapping about the horn 27.

As pointed out above, the entire structure of the motor generator of this invention may be dissembled without derangement of the truck and from the above description it may be seen that the motor housing 21 may be separated at the flange 20 from the generator casing 1 and completely withdrawn from the machine, leaving the motor armature or rotor exposed, permitting withdrawal, in fact, of the entire rotatable parts of the machine, thus lending access to the field of the generator. At the same time an end plate 28 of the generator housing may be removed and access to the generator brushes obtained as well as the generator field. All of the above may thus be seen to be conveniently accomplished without derangement of the truck axles or their supporting structure.

While the apparatus of this invention has been described above in connection with one specific instance thereof, it is intended that the protection of Letters Patent to be granted hereon be not unnecessarily limited thereby, but extend to the full scope of the invention as represented by the scope of the claims appended hereto.

What I claim as my invention is:

1. In a portable motor generator truck and frame construction, the combination comprising a horizontal generator casing, a fixed axle secured at one end thereof, truck wheels mounted thereon, a pivoted axle secured at the opposite end thereof, truck wheels also mounted thereon, an end plate and bearing support in said generator casing above said pivoted axle, an overhanging motor housing secured at the opposite end of said casing, a bearing mounted thereon, and rotating parts of a motor generator mounted between said first-mentioned and said last-mentioned bearings.

2. In a portable motor generator truck and frame construction, the combination comprising a horizontal tubular generator casing, an axle bracket secured beneath one end thereof, an axle mounted in said bracket, truck wheels mounted thereon, a depending pivot pin the opposite end of said casing, an upon said pin, truck wheels mounted beneath pivoted axle, an end plate and bearing support in said generator casing above said pivoted axle, an overhanging motor housing secured at the opposite end of said casing, a bearing mounted in said housing and rotating parts of a motor generator mounted between said first-mentioned and said last-mentioned bearings.

3. In a portable motor generator truck and frame construction, the combination comprising a horizontal generator casing, a pair of wheeled axles secured beneath the same and at the ends thereof, an end plate and bearing support secured in one end of said generator casing, an overhanging motor housing secured at the opposite end of said casing, a bearing mounted thereon, and rotating parts of a motor generator mounted between said first-mentioned and said last-mentioned bearings.

4. In a portable motor generator truck and frame construction, the combination comprising an enclosure for said motor generator, parts comprising a truck-supported generator portion, and a separable overhanging motor portion.

WILLIAM J. OESTERLEIN.